United States Patent
de Groot

(10) Patent No.: US 7,178,621 B2
(45) Date of Patent: Feb. 20, 2007

(54) MOTORCYCLE

(76) Inventor: Jan de Groot, Voltaweg 8, 5482 TM Schijndel (NL)

( * ) Notice: Subject to any disclaimer, the term of this patent is extended or adjusted under 35 U.S.C. 154(b) by 0 days.

(21) Appl. No.: 11/035,408

(22) Filed: Jan. 12, 2005

(65) Prior Publication Data

US 2005/0205327 A1 Sep. 22, 2005

Related U.S. Application Data

(60) Provisional application No. 60/544,396, filed on Feb. 13, 2004.

(30) Foreign Application Priority Data

Jan. 13, 2004 (NL) .................................... 1025221

(51) Int. Cl.
*B62D 61/02* (2006.01)
(52) U.S. Cl. ..................................... 180/227
(58) Field of Classification Search ................. 180/227
See application file for complete search history.

(56) References Cited

U.S. PATENT DOCUMENTS

| | | | | |
|---|---|---|---|---|
| 4,561,519 A | * | 12/1985 | Omori | 180/227 |
| 4,724,920 A | * | 2/1988 | Tsuchida et al. | 180/227 |
| 5,348,112 A | * | 9/1994 | Vaillancourt | 180/227 |
| 5,487,443 A | * | 1/1996 | Thurm | 180/227 |
| 5,816,357 A | | 10/1998 | Camlin | 180/227 |
| 5,839,536 A | | 11/1998 | Tanaka | 180/227 |
| 6,446,996 B1 | | 9/2002 | Horii | 280/281.1 |
| 6,581,711 B1 | | 6/2003 | Tuluie | 180/227 |
| 6,598,893 B2 | * | 7/2003 | Parigian | 280/284 |
| 6,871,867 B2 | * | 3/2005 | Parigian | 280/284 |
| 2002/0074771 A1 | * | 6/2002 | Parigian | 280/286 |
| 2002/0130486 A1 | * | 9/2002 | Parigian | 280/284 |
| 2003/0193164 A1 | * | 10/2003 | Parigian | 280/284 |

FOREIGN PATENT DOCUMENTS

| | | | |
|---|---|---|---|
| GB | 2 037 678 A | | 7/1980 |
| GB | 2 045 178 A | | 10/1980 |
| GB | 2 142 591 A | | 1/1985 |
| GB | 2142591 A | * | 1/1985 |
| JP | 02077387 A | * | 3/1990 |
| WO | 98/43873 | | 10/1998 |

* cited by examiner

*Primary Examiner*—Lesley D. Morris
*Assistant Examiner*—Marlon Arce-Diaz
(74) *Attorney, Agent, or Firm*—Ladas & Parry LLP

(57) ABSTRACT

The invention relates to a motorcycle comprising a frame, in which at least an engine is mounted; a front fork pivoted to the frame, in which at least a front wheel is mounted; a rear fork pivoted to the frame, in which at least a rear wheel to be driven by the engine is mounted; as well as a spring system connected to the rear fork and to the frame, wherein the spring system is arranged for exerting forces on the frame in a forward direction substantially parallel to the direction of movement of the motorcycle.

5 Claims, 3 Drawing Sheets

MOTORCYCLE

RELATED U.S. APPLICATION DATA

Benefit is claimed of U.S. Provisional Patent Application No. 60/544,396, filed on Feb. 13, 2004.

FIELD OF THE INVENTION

The invention relates to a motorcycle comprising a frame, in which at least an engine is mounted; a front fork pivoted to the frame, in which at least a front wheel is mounted; a rear fork pivoted to the frame, in which at least a rear wheel to be driven by the engine is mounted; as well as a spring system connected to the rear fork and to the frame, which comprises at least one shock absorber which is horizontally oriented in the motorcycle and which is positioned under the engine, said shock absorber being connected to the frame on the one hand and to the rear fork on the other hand.

BACKGROUND OF THE INVENTION

Such a motorcycle is known, for example from U.S. Pat. No. 6,446,996 B1. Known motorcycles of the type referred to in the introduction comprise a spring system which, upon inward springing of the rear wheel, for example on an uneven surface with bumps and hollows, such as a motocross circuit, transmits forces to the frame, the rider and the front wheel in such a manner as to have an adverse effect on the driving characteristics of the motorcycle (the stability, the balance and the roadability).

Inward springing of the rear wheel causes the frame to spring upwards ("kicking") and the front wheel to spring downwards in reaction thereto, resulting in a jolting behaviour of the motorcycle. As a result, the rear wheel as well as the front wheel constantly lose contact with the surface, which has an adverse effect on the traction or propulsion in the case of the rear wheel and on the steering behaviour in the case of the front wheel. Thus, also the engine efficiency decreases accordingly.

OBJECT OF THE INVENTION

The object of the invention is to obviate the above drawbacks and to provide a motorcycle as referred to in the introduction that has improved driving characteristics.

SUMMARY OF THE INVENTION

According to the invention, the motorcycle is to that end characterized in that the spring system is arranged for exerting forces on the frame in a forward direction substantially parallel to the direction of movement of the motorcycle.

As a result, the extent to which jolting upward and downward springing of the frame and the front wheel takes place is significantly reduced, and the traction of the rear wheel and the steering behaviour of the front wheel are advantageously affected. All this results in a motorcycle exhibiting significantly improved driving characteristics (stability, balance and roadability), which offers major advantages in particular in the case of motocross races.

The aim is to convert all the upward forces that cause the rear wheel of the motorcycle to spring upwards ("kicking") under the influence of the unevennesses in the terrain into forward forces by means of the spring system according to the invention, so that the motorcycle as a whole will exhibit an improved stability, balance and traction (on the rear wheel) and, as a result, will be safer.

Especially in the case of motocross races, it will be possible to realize faster lap times when using such a spring system.

In a special embodiment of the motorcycle according to the invention, the spring system comprises at least one shock absorber that is horizontally oriented in the motorcycle, which shock absorber is connected to the frame on the one hand and to the rear fork on the other hand.

Since the shock absorber is positioned under the engine in a very functional embodiment, a more compact motorcycle having a lower centre of gravity is obtained, which motorcycle, in addition to being lighter, is also more easily maneuverable and more stable.

In one embodiment, the forces can act in the direction of movement of the motorcycle in that the spring system comprises a lever, which lever is connected to the rear fork at a first pivoting point and to the shock absorber at a second pivoting point.

Furthermore, the spring system may comprise an auxiliary arm that is pivoted to the frame with a first end, which auxiliary arm is connected to a third pivoting point of the lever with the other end.

In a specific embodiment, the first end of the auxiliary arm is located in the immediate vicinity of the hinge point of the rear fork and the frame. As a result of this construction, the rear fork extends at a small angle with respect to the horizontal, thus preventing unexpected extension of the spring system by the drive chain (upon acceleration).

In a first suitable embodiment of this spring system, the first pivoting point is located between the second and the third pivoting point, whilst in another functional embodiment the third pivoting point is located between the first and the second pivoting point.

In a specific embodiment, said first end and said other end of the auxiliary arm as well as the hinge point of the rear fork and the first pivoting point of the lever furthermore form the corner points of a trapezium, which, in addition to a simplification of the construction, also enables an improved control of the interaction of forces that occurs in the motorcycle.

The shock absorber and/or the auxiliary arm may be oriented substantially parallel to the rear fork in a position of rest.

A further advantage of the construction of the spring system according to the invention is achieved in that the air inlet passage from the air filter to the engine is of rectilinear construction. As a result of the horizontal orientation of the spring system in the motorcycle, additional mounting space is obtained, which space can be utilized for creating a rectilinear air inlet passage. Thus, not only the construction of the motorcycle but also the air inlet passage to the engine is improved, resulting in an improved efficiency thereof. As a result of the improved fuel-air mixture, the engine delivers more power and a larger torque, which leads to a reduced fuel consumption, therefore.

Reference is furthermore made to U.S. Pat. No. 6,581,711, which likewise discloses a motorcycle as referred to in the introduction. In said US Patent, use is made of a specific spring/shock absorbing mechanism, in which a shock absorber and an arm extending parallel thereto are jointly pin-pivoted to the rear fork.

In this specific construction, however, the parallel arm will exert a force on the frame larger than the force of the shock breaker, which force acts in a direction opposed to the direction of movement of the motorcycle. Said force engages below the centre of gravity of the motorcycle, resulting in strong diving of the front of the motorcycle, comparable to the situation when a vertically disposed shock absorber is used. Furthermore, the assembly of the shock absorber and the parallel arm is mounted below the hinge point of the rear fork to the engine block, as a result of which the rear fork, too, is mounted higher in the frame.

The angle at which the rear fork extends with respect to the horizontal as a result thereof is larger than usual, which adversely affects the traction of the motorcycle. The forces exerted by the drive chain upon acceleration of the motorcycle will attempt to extend the spring of the shock absorber unit, as it were.

In motocross races it is furthermore desirable for the motorcycles to have a large ground clearance of at least 35 cm. Since the shock absorber unit and the parallel arm are mounted under the rear fork of the motorcycle, the engine block, too, will be mounted higher in the frame. Apart from the fact that this also leads to a larger angle between the rear fork and the horizontal, the centre of gravity of the motorcycle will be positioned higher as well. This has a negative effect on the stability and the roadability of the motorcycle during motocross races.

BRIEF DESCRIPTION OF THE DRAWINGS

The invention will now be explained in more detail with reference to a drawing, in which.

For a better understanding of the invention, like parts will be indicated by the same numerals in the description of the figures below.

DETAILED DESCRIPTION OF THE DRAWINGS

Figure 1:
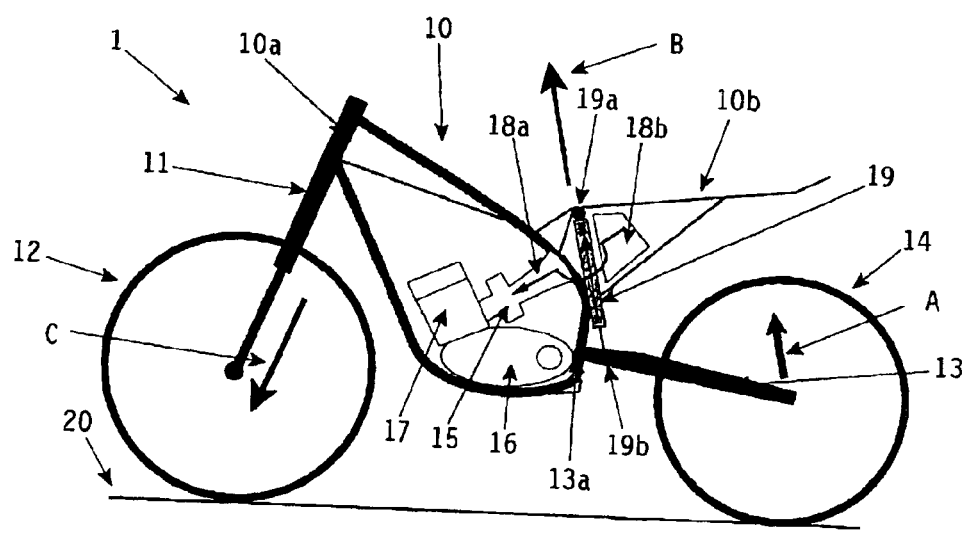
FIG. 1 shows an embodiment of a motorcycle according to the prior art.

FIG. 1 shows a motorcycle according to the prior art. The motorcycle 1 consist of a frame 10 including a front tube 10a, in which a front fork 11 is rotatably mounted. The front fork 11 can be rotated by means of handlebars (not shown). A front wheel 12 is mounted in the front fork 11. The motorcycle 1 according to the prior art furthermore comprises a rear fork 13, in which a rear wheel 14 is mounted. The rear fork 13 is pivoted to the frame 10 via point of attachment 13a.

The frame 10 accommodates an engine assembly built up of an engine 16 with a cylinder 17 as well as a carburetor 15, which carburetor is connected to an air filter 18b by means of an air inlet passage 18a. The air filter 18b is positioned under the seat 10b.

The motorcycle according to the prior art furthermore includes a spring system 19 consisting of a shock absorber 19, which is connected to the frame 10 on the one hand and to the rear fork 13 on the other hand at points of attachment 19a and 19b, respectively.

During movement of the motorcycle 1 over the surface 20, the rear wheel 14 springs inward, which inward springing movement is transmitted to the frame 10 via the rear fork 13 and the vertically disposed shock absorber 19. Said inward springing of the rear wheel, for example on an uneven surface 20 comprising bumps and hollows, such as a motocross circuit, results in upward springing ("kicking") of the frame 10, and thus in a jolting behaviour of the motorcycle 1. The inward springing movement of the rear wheel 14 is indicated by the arrow A, whilst the upward "kicking" movement of the frame 10/the motorcycle 1 is indicated by the arrow B.

This interaction of forces furthermore causes the front wheel 12 to spring downward, as is indicated by the arrow C. The jolting behavior of the motorcycle 1 according to the prior art results in the rear wheel 14 and the front wheel constantly losing contact with the surface 20. This leads to a less efficient traction or propulsion of the rear wheel 14 and to less favorable steering characteristics of the front wheel 12. In addition to that, it leads to a reduced efficiency of the engine 12.

Figure 2:
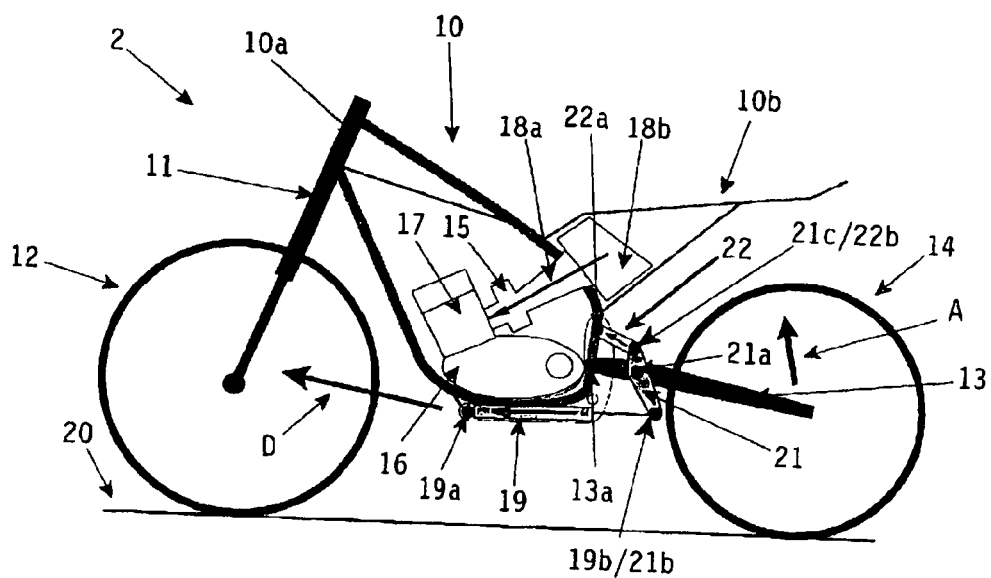
FIG. 2 shows a first embodiment of a motorcycle according to the invention.

FIG. 2 shows an embodiment of a motorcycle according to the invention that does not have the drawbacks of the prior art motorcycle 1 as described above. The motorcycle 2 according to the invention likewise comprises a spring system 19, the shock absorber 19 of which is horizontally mounted in the frame 10. Analogously to FIG. 1, the shock absorber 19 is connected to the frame 10 at point of attachment 19a and to the rear fork 13 at point of attachment 19b.

More in particular, the spring system of the motorcycle 2 according to the invention includes an additional lever 21 that is connected to the rear fork 13 at a first pivoting point 21a. The lever 21 is connected to the shock absorber 19 via a second pivoting point 21b (point of attachment 19b) The lever 21 further comprises a third pivoting point 21c, which functions as the point of attachment 22b for an auxiliary arm 22, which is connected to the frame 10 with its other end 22a.

The spring system according to the invention functions as follows. Upward springing of the rear wheel 14/the rear fork 13 (arrow A) results in an upward movement of the first pivoting point 21a of the lever 21 about the hinge point 13a of the rear fork 13. Likewise, the third pivoting point 21c of the lever 21 will move upwards and impart a pivoting movement about the first pivoting point 21a to the lever 21 via the auxiliary arm 22, which pivoting movement takes place in clockwise direction.

Accordingly, the second pivoting point 21b connected to the shock absorber 19 will undergo a movement in the forward direction of the motorcycle 2. Said forward movement of the pivoting point 21b results in a force (indicated by the arrow 0) being exerted in forward direction on the frame 10, and thus on the motorcycle 2, by the shock absorber 19.

As a result of this construction of the spring system according to the invention, inward springing of the rear wheel 14 (arrow A) does not cause the frame 10 to spring upwards ("kicking"), as is the case with prior art motorcycles, but the spring system according to the invention prevents the front wheel 12 springing inwards and outwards in a jolting manner.

This has an advantageous effect on the traction of the rear wheel 14 as well as on the steering behaviour of the front wheel 12. The action of the forces being exerted in forward direction (parallel to the direction of movement) on the frame 10/the motorcycle 2 according to the invention by the spring system 19, 21, 22 results in a motorcycle exhibiting improved driving characteristics as regards stability, balance and roadability. In combination with the improved steering characteristics of the front wheel 12, these improved characteristics can be used to advantage during motocross races.

Figure 3:
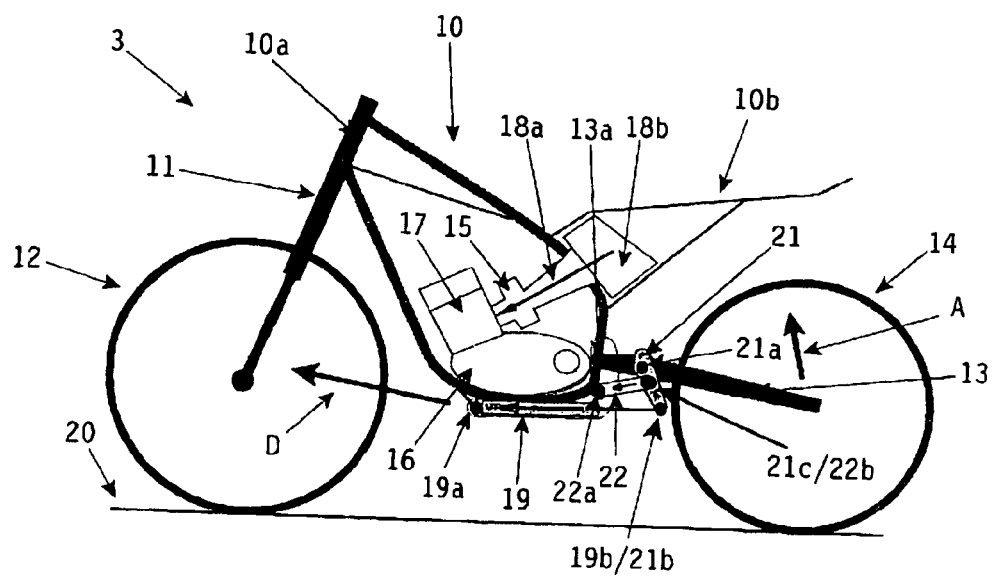
FIG. 3 shows a second embodiment of a motorcycle according to the invention.

Another embodiment is shown in FIG. 3. In the embodiment of in FIG. 3, the third pivoting point 21c is located between the first pivoting point 21a and the second pivoting point 21b, whereas in the embodiment of FIG. 2 the first pivoting point 21a of the lever 21 is located between the second pivoting point 21b and the third pivoting point 21c. As FIG. 3 clearly shows, the auxiliary arm 22 is mounted under the rear fork 13, in contrast to the embodiment that is shown in FIG. 2.

This provides a more compact construction of the spring system according to the invention. In addition to that, the centre of gravity will be located further down, resulting in an improved roadability of the motocross bike.

In this second embodiment, too, upward springing movement of the rear wheel 14 (and the rear fork 13) results in upward movement of the first pivoting point 21a about the hinge point 13 of the rear fork 13 and pivoting movement of the lever 21 in clockwise direction. Said pivoting movement about the first pivoting point 21a results in a movement of the second pivoting point 21b in forward direction. The shock absorber 19 will transmit this movement in the form of forces as indicated by the arrow D.

It will be understood that the two embodiments as shown in FIGS. 2 and 3 provide a motocross bike according to the invention that exhibits strongly improved driving characteristics, which give the motorcycle an advantage over prior art motorcycles during motocross races. Since the rear wheel 14 retains a better hold on the surface 20, in particular on unevennesses such as the bumps and hollows or ruts of a motocross circuit, the motorcycle 2 or 3 (FIGS. 2 and 3) exhibits an improved traction, which has a very positive effect on the movement and/or the acceleration of the motorcycle.

Especially when deep ruts are present in the surface 20, the motorcycle according to the invention exhibits an improved stability as a result of the action of the forces being exerted in forward direction on the frame 10 of the motorcycle by the spring system. Furthermore, the rear wheel will spring upward less strongly ("kicking") while braking in bends, so that also the front wheel 12 will spring upwards and downwards less. As a result, the front wheel 12 will have more traction on the surface 20 as well, resulting in strongly improved steering characteristics, in particular while cornering.

The strongly improved balance of the motorcycle according to the invention increases the safety level for the rider, resulted in significantly faster lap times (up to two seconds per lap) during motocross races.

A further aspect of the motorcycle according to the invention is furthermore shown in FIGS. 2 and 3 (in combination with FIG. 1). The vertical position of the shock absorber 19 in the frame 10 of a motorcycle according to the prior art (see FIG. 1) makes it necessary to use a complex, bent construction of the air inlet passage 18a around the shock absorber 19 for supplying air through the filter 18b via the air inlet passage 18a in the direction of the carburetor 15 and the cylinder 17 of the engine 16. This complex, bent construction of the air inlet passage 18 interferes with an adequate, efficient supply of air to the engine 16 and thus results in a reduced efficiency level.

The spring system according to the invention makes it possible to use a rectilinear air inlet passage 18a, as is clearly shown in FIGS. 2 and 3 (in comparison with FIG. 1). The rectilinear construction of the air inlet passage 18a from the air are filter 18b to the carburetor 15 and the cylinder 17 results in a strongly improved air supply to the engine, which is thus supplied with an improved combustion mixture (fuel-air mixture).

Not only is the fuel consumption significantly reduced as a result of that, but the engine 16 will have more power and be capable of transmitting a larger torque to the rear wheel 14. As a result of the strongly improved engine efficiency that is achieved in this way, a more powerful motorcycle having an improved traction and acceleration, in particular during motocross races, is realized.

The invention claimed is:

1. A motorcycle comprising:
a frame, in which at least an engine is mounted;
a front fork pivoted to the frame, in which at least a front wheel is mounted;
a rear fork pivoted to the frame, in which at least a rear wheel to be driven by the engine is mounted; as well as a spring system connected to the rear fork and to the frame, which comprises at least one shock absorber which is horizontally oriented in the motorcycle and which is positioned under the engine, said shock absorber being connected to the frame on the one hand and to the rear fork on the other hand, characterized in that the spring system is arranged for exerting forces on the frame in a forward direction substantially parallel to the direction of movement of the motorcycle, wherein the spring system comprises
a lever, which lever is connected to the rear fork at a first pivoting point and to the shock absorber at a second pivoting point;
an auxiliary arm that is pivoted to the frame with a first end, which auxiliary arm is connected to a third pivoting point of the lever with the other end;
wherein the first pivoting point is located between the second and the third pivoting point.

2. A motorcycle according to claim 1, characterized in that the first end of the auxiliary arm is located in the immediate vicinity of the hinge point of the rear fork and the frame.

3. A motorcycle according to claim 1, characterized in that said first end and said other end of the auxiliary arm as well as the hinge point of the rear fork and the first pivoting point of the lever form the corner points of a trapezium.

4. A motorcycle according to claim 1, characterized in that the shock absorber and/or the auxiliary arm are oriented substantially parallel to the rear fork in a position of rest.

5. A motorcycle according to claim 1, characterized in that the air inlet passage from the air filter to the engine is of rectilinear construction.

* * * * *